(No Model.)
C. O. McBRIDE.
NUT LOCK.
No. 354,332. Patented Dec. 14, 1886.
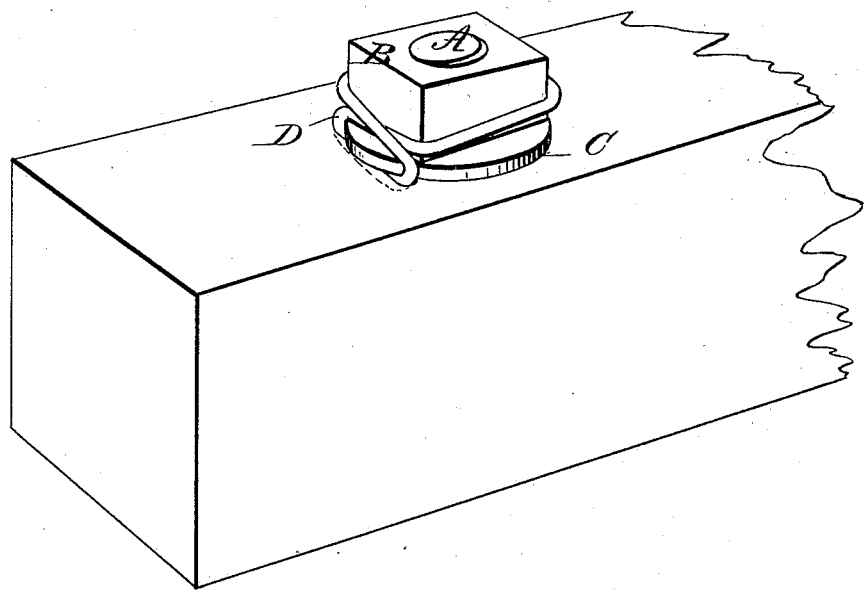
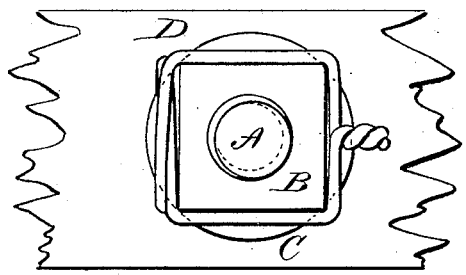
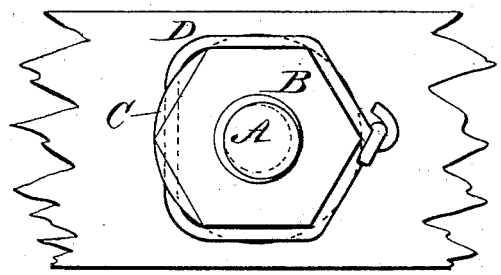
WITNESSES:
INVENTOR:
C. O. McBride
BY Munn & Co
ATTORNEYS.

UNITED STATES PATENT OFFICE.

CHARLES O. McBRIDE, OF MUSCATINE, IOWA.

NUT-LOCK.

SPECIFICATION forming part of Letters Patent No. 354,332, dated December 14, 1886.

Application filed May 1, 1886. Serial No. 200,826. (No model.)

*To all whom it may concern:*

Be it known that I, CHARLES O. McBRIDE, of Muscatine, in the county of Muscatine and State of Iowa, have invented a new and useful Improvement in Nut-Locks, of which the following is a specification, reference being had to the annexed drawings, forming a part thereof, in which—

Figure 1 is a perspective view of a bolt and nut, showing the application of my improved nut-lock. Fig. 2 is a plan view. Fig. 3 is a plan view showing the application of the nut-lock to a hexagon nut.

Similar letters of reference indicate corresponding parts in the different figures of the drawings.

The object of my invention is to provide a simple, inexpensive, and secure nut-lock for preventing the nuts of bolts from accidentally unscrewing.

My invention consists in a wire clamped between the washer of the bolt and the beam to which the bolt is applied, and bent around the nut and twisted together to prevent the nut from turning.

The bolt A, nut B, and washer C are of the usual description. When the bolt is applied to wood-work, the wire D is placed between the wood and the washer C, near one edge of the washer, and is forced into the wood by turning the nut B down upon the washer. After the wire D is clamped in this manner it is bent upward over the edge of the washer C, then across the washer in opposite directions at one side of the nut, then along opposite sides of the nut, then across the remaining side of the nut, where the ends are twisted together, binding the nut firmly, so that it cannot accidentally turn on the bolt.

In the case of a hexagon nut, as shown in Fig. 3, the wire D, after being bent outward at right angles with the washer, may be bent over parallel with the face of the washer at opposite sides of the nut, and afterward brought together around the two remaining sides of the nut and twisted.

When my improved nut-lock is applied to iron-work, the iron in contact with which the washer C rests is grooved to receive the wire D, the wire being treated in the manner already described after it is clamped in the groove by the washer.

My improved nut-lock is inexpensive, and readily applied and removed, and is effective in preventing the accidental turning of the nut.

I am aware that washers have been grooved to receive a wire for locking the nut on a bolt, and I do not claim the same as of my invention. In my construction the ordinary nut, bolt, and washer are used, and the nut is held from turning by a wire held between the washer and the article through which the bolt is passed, and bent around the nut and twisted.

Having thus described my invention, what I claim as new, and desire to secure by Letters Patent, is—

1. A nut-lock formed of a wire clamped between the washer and the wood to which the bolt is applied, and bent around the nut and twisted together, substantially as herein shown and described.

2. The combination, with the bolt A, nut B, and washer C, of the wire D, clamped by the washer, bent around the nut and twisted together, substantially as herein shown and described.

3. The combination, with the piece C, the bolt passed therethrough, and the washer and nut on said bolt, of the wire D, clamped between the washer and the piece C, then bent upward and across the washer in opposite directions at one side of the nut, then along opposite sides of the nut, then across the remaining side of the nut, where the ends are twisted together, as shown and described.

CHARLES O. McBRIDE.

Witnesses:
 H. C. MADDEN,
 P. M. DETWILER.